(12) United States Patent
Horikoshi et al.

(10) Patent No.: US 6,373,146 B2
(45) Date of Patent: *Apr. 16, 2002

(54) OCCUPANT PROTECTION APPARATUS

(75) Inventors: Tadashi Horikoshi; Yoichi Hashimoto; Yoshihiro Akiba, all of Saitama (JP)

(73) Assignee: Kansei Corporation, Saitama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,974

(22) Filed: Oct. 4, 1999

(30) Foreign Application Priority Data

Oct. 2, 1998 (JP) ............................................ 10-281483
Dec. 8, 1998 (JP) ............................................ 10349124

(51) Int. Cl.⁷ .................................................. B60L 1/00
(52) U.S. Cl. ...................................... 307/10.1; 701/45
(58) Field of Search ............................... 180/272, 271;
280/735; 307/10.1, 121; 340/436, 438,
540, 567; 701/45–47; 33/512, 700, 701

(56) References Cited

U.S. PATENT DOCUMENTS

| 4,985,835 | A | * | 1/1991 | Sterler et al. ............... 280/735 |
| 5,330,226 | A | * | 7/1994 | Gentry et al. ............... 280/735 |
| 5,445,413 | A | * | 8/1995 | Rudolf et al. ............... 280/735 |
| 5,446,661 | A | * | 8/1995 | Gioutsos et al. ........... 307/10.1 |
| 5,787,377 | A | * | 7/1998 | Watanabe et al. .......... 307/10.1 |
| 5,859,583 | A | * | 1/1999 | Mayumi et al. ............. 340/436 |
| 5,954,360 | A | * | 9/1999 | Griggs, III et al. ......... 280/735 |

* cited by examiner

*Primary Examiner*—Fritz Fleming
(74) *Attorney, Agent, or Firm*—Sughrue Mion, PLLC

(57) ABSTRACT

A position of a head of an occupant from an instrument panel, for example, of a vehicle is measured with a predetermined period of time and the position of the head after a predetermined time is estimated from the measured position, whereby an ignition signal is supplied to a detonator at a suitable timing determined by the estimated position thereby to inflate an air bag. The distance of the head of the occupant from the instrument panel is divided into an inflation suppression area, an inflation area without timing delay and an inflation area with timing delay. When it is determined that the head of the occupant locates in the inflation area with timing delay, the time point at which the head shifts to the inflation area without timing delay is estimated and the air bag is inflated on the basis of the estimated time point.

10 Claims, 6 Drawing Sheets

OCCUPANT PROTECTION APPARATUS

BACKGROUND OF THE INVENTION

1. Field of the Invention

The present invention relates to an occupant protection apparatus which deploys an air bag at a timing according to the seated posture of an occupant, thereby to protect the occupant at the time of collision of a vehicle.

2. Description of the Related Art

Such a kind of conventional occupant protection apparatus is disclosed in Japanese Patent Kokai (Unexamined Laid-Open) No. Hei. 5-1324. The arrangement of this conventional occupant protection apparatus will be explained with reference to FIG. 8.

In this arrangement, acceleration of a vehicle generated by the collision of the vehicle is detected by an acceleration sensor 1, then an acceleration signal from the acceleration sensor 1 is integrated twice by first and second integration circuits 2 and 3 to obtain an amount of deviation, and further the acceleration signal is applied to a first coefficient circuit 4 through the first integration circuit 2 thereby to obtain a speed of the vehicle. The acceleration signal from the acceleration sensor 1 is applied to a second coefficient circuit 5 to obtain the acceleration multiplied by a coefficient. These deviation amount, speed and the coefficient-multiplied acceleration thus obtained are added by an adding circuit 6 to estimate a deviation amount after a predetermined time period. When the estimated deviation amount reaches a predetermined position, an ignition signal is supplied to a detonator 7 through the adding circuit 6 thereby to inflate an air bag.

Since the seated posture, sliding amount of a seat or the like are determined in a limited range to some extent for each driver, there is not a large difference in the distance for the respective drivers from the surface of the air bag inflated at the maximum to the initial position of the head of each driver. Thus, as for drivers, aforesaid method of inflating the air bag based on the estimated deviation amount of the head of an occupant can be realized.

However, an occupant sitting on the seat next to a driver may cross his or her legs or lie on the seat by reclining the seat at a large inclined angle with his or her preference, so that the initial position of the head portion of the occupant at the seat next to the driver differs greatly. Thus, there is a problem that the aforesaid estimation method can not be employed for an occupant sitting on the seat next to the driver.

SUMMARY OF THE INVENTION

Accordingly, the present invention has been performed so as to obviate the aforesaid problem of the conventional art.

An object of the present invention is to provide an occupant protection apparatus and method which measures at every lapse of a predetermined time period the position of the head of an occupant from an instrument panel, for example, of a vehicle, then estimates the position of the head after a predetermined time period based on the measured position, and provides an ignition signal to a detonator at a suitable timing based on the estimated position thereby to inflate an air bag.

Another object of the present invention is to provide an occupant protection apparatus and method which measures at every lapse of a predetermined time period the position of the head of an occupant from an instrument panel, and the measured position is interpolated by a deviation value which is obtained by integrating twice a magnitude of acceleration of a vehicle, thereby to measure the position of the head of the occupant from the instrument panel with a high accuracy.

According to a first aspect of the present invention, there is provided an occupant protection apparatus comprising:

an acceleration sensor which detects acceleration of a vehicle at a time of collision and outputs an acceleration signal representing a magnitude of the acceleration;

a timing control circuit which measures a distance between the head of an occupant sitting on a seat slidable along a longitudinal direction of the vehicle and having a reclining function and an instrument panel, compares the distance thus measured with threshold values and controls a timing for igniting a detonator for driving a main body of the protection apparatus in accordance with a result of the comparison; and an ignition control circuit which ignites the detonator in accordance with the timing thus controlled when the acceleration signal is outputted from the acceleration sensor, wherein the timing control circuit sets the threshold values to be compared with the distance between the head of the occupant and the instrument panel in correspondence with an inflation suppression area, an inflation area without timing delay and an inflation area with timing delay, respectively.

According to a second aspect of the present invention, there is provided an occupant protection apparatus, comprising a plurality of detonators are provided for a single inflator.

According to a third aspect of the present invention, there is provided an occupant protection apparatus, wherein the threshold values set by the timing control circuit are set in accordance with the distance from the instrument panel in an order of the inflation suppression area, the inflation area without timing delay and the inflation area with timing delay.

According to a fourth aspect of the present invention, there is provided an occupant protection apparatus, wherein the timing control circuit, when determines that the head of the occupant locates in the inflation area with timing delay, estimates a timing at which the head of the occupant shifts to the inflation area without timing delay from the inflation area with timing delay, and simultaneously ignites a plurality of the detonators at the estimated timing.

According to a fifth aspect of the present invention, there is provided an occupant protection apparatus, wherein the timing control circuit, when the timing control circuit determines that the head of the occupant locates in the inflation suppression area, the timing control circuit ignites one of the plurality of detonators.

According to a sixth aspect of the present invention, there is provided a method comprising the steps of:

measuring repeatedly with a first period of time a distance between the head of an occupant sitting on a seat and an instrument panel by using output signals of a plurality of sensors;

integrating twice with a second period of time shorter than the first period of time an acceleration signal representing a magnitude of acceleration of a vehicle from an acceleration sensor which is one of the plurality of sensors thereby to obtain an amount of deviation of a position of the head of the occupant; and subtracting the amount of the deviation thus obtained through the integration from the distance thus measured with the first period of time thereby to estimate a distance between the head of the occupant sitting on the seat and the instrument panel.

According to a seventh aspect of the present invention, there is provided an occupant protection apparatus comprising:

a first distance measuring means which measures repeatedly with a first period of time a distance between the head of an occupant sitting on a seat and an instrument panel by using output signals of a plurality of sensors;

an integration means which integrates with a second period of time shorter than the first period of time an acceleration signal representing a magnitude of acceleration of a vehicle from an acceleration sensor which is one of the plurality of sensors thereby to obtain an amount of deviation of a position of the head of the occupant;

a second distance measuring means which subtracts the amount of deviation thus obtained by the integration means from the distance thus measured by the first distance measuring means thereby to measure a distance between the head of the occupant sitting on the seat and the instrument panel; and a driving control means which allows an ignition signal for igniting and driving a detonator to be outputted when the distance measured by the second distance measuring means exceeds a threshold value.

According to an eighth aspect of the present invention, there is provided an occupant protection apparatus, wherein the threshold value includes a first threshold value which is set in a vicinity of the instrument panel and defines an inflation suppression area for restricting inflation of an air bag between the instrument panel and the occupant, and a second threshold value which is set so as to distinguish an inflation area without timing delay set at an outer side of the inflation suppression area from an inflation area with timing delay set at an outer side of the inflation area without timing delay, and wherein the driving control means subtracts the amount of the deviation calculated by the integration means from the distance measured by the first distance measuring means to obtain a distance between the head of the occupant sitting on the seat and the instrument panel only when it is determined that the head of the occupant sitting on the seat locates in the inflation area with timing delay.

According to a ninth aspect of the present invention, there is provided an occupant protection apparatus, wherein the driving control means allows to supply an ignition signal for driving the detonator when it is determined that the distance between the head of the occupant and the instrument panel thus obtained is shifted into the inflation area without timing delay.

DETAILED DESCRIPTION OF THE PRESENT INVENTION

The occupant protection apparatus according to the first embodiment of the present invention will be explained with reference to FIG. 1.

Figure 1:
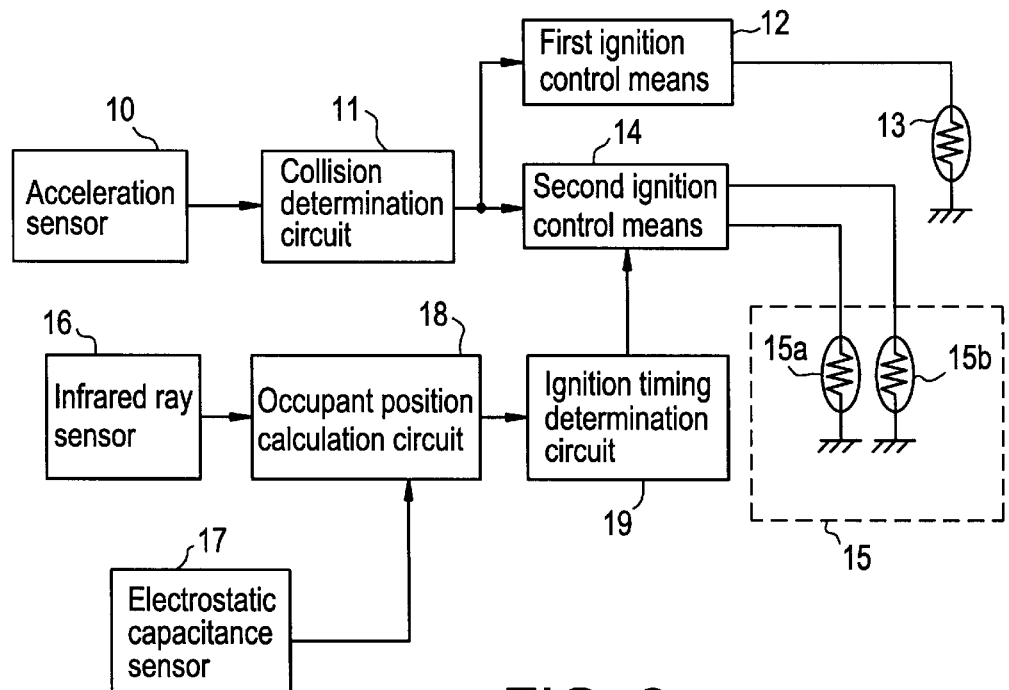
FIG. 1 is a block diagram of an occupant protection apparatus according to the first embodiment of the present invention.

In FIG. 1, a reference numeral 10 depicts an acceleration sensor which detects a magnitude of acceleration generated along the longitudinal direction (that is, front and rear direction) of a vehicle and outputs an acceleration signal representing a magnitude of the detected acceleration. A reference numeral 11 depicts a collision determination circuit which receives the acceleration signal supplied from the acceleration sensor 10 to determine the magnitude of the collision, and outputs an ignition signal in accordance with the determined magnitude of the collision. A reference numeral 12 depicts a first ignition control circuit which supplies an ignition current to a driver seat side detonator 13 in response to the ignition signal supplied from the collision determination circuit 11 to inflate an air bag provided at a steering. A reference numeral 14 depicts a second ignition control circuit which controls the supply of an ignition signal to a passenger seat side detonator 15 on the basis of a control signal supplied from an ignition timing determination circuit 19 described later when the ignition signal is supplied from the collision determination circuit 11. The passenger seat side detonator 15 is provided with a plurality of detonators 15a and 15b for a single inflator. That is, the single inflator is divided into two sections, and the detonators 15a and 15b respectively provided in correspondence with the two sections are supplied with ignition currents separately from the second ignition control circuit 14.

A reference numeral 16 depicts an infrared ray sensor which is provided at the instrument panel in front of the passenger seat so as to be directed to the passenger seat and detects an infrared ray from a person sitting on the passenger seat. A reference numeral 17 depicts an electrostatic capacitance sensor which is provided at the instrument panel in front of the passenger seat like the infrared ray sensor 16 and detects the distance from the instrument panel to the person sitting on the passenger seat thereby to output a detection signal representing the detected distance.

A reference numeral 18 depicts an occupant position calculation circuit which determines whether or not a person or occupant is sitting on the passenger seat on the basis of the output from the infrared ray sensor 16. The occupant position calculation circuit 18 further determines, on the basis of the detection signal from the electrostatic capacitance sensor 17, that the head of the occupant is in an inflation suppression area (FIG. 2) when the detected distance of the head from the instrument panel represents that the head of the occupant is positioned between 0 and a first threshold value (L1); that the head of the occupant is in an inflation area without timing delay (FIG. 2) when the detected distance represents that the head of the occupant is positioned between the first threshold value (L1) and a second threshold value (L2) (first threshold value (L1) <second threshold value (L2)); and that the head of the occupant is in an inflation area with timing delay (FIG. 2) when the detected distance represents that the head of the occupant is positioned away from the second threshold value (L2).

The ignition timing determination circuit 19 supplies an inflation inhibit signal or an ignition signal for igniting only one of the detonators 15a and 15b to the second ignition control circuit 14, in response to the signal supplied from the occupant position calculation circuit 18 representing that the head of the occupant locates in the inflation suppression area. The ignition timing determination circuit 19 supplies an ignition signal for simultaneously igniting both the detonators 15a and 15b to the second ignition control circuit 14, in response to the signal supplied from the occupant position calculation circuit 18 representing that the head of the occupant locates in the inflation area without timing delay. Further, the ignition timing determination circuit 19 temporarily suspends the supply of the ignition signal for igniting the detonators 15a and 15b to the second ignition control circuit 14 and then supplies the ignition signal for igniting both the detonators 15a and 15b to the second ignition control circuit 14 when the head of the occupant moves into the inflation area without timing delay, in response to the signal supplied from the occupant position calculation circuit 18 representing that the head of the occupant locates in the inflation area with timing delay.

Figure 3:
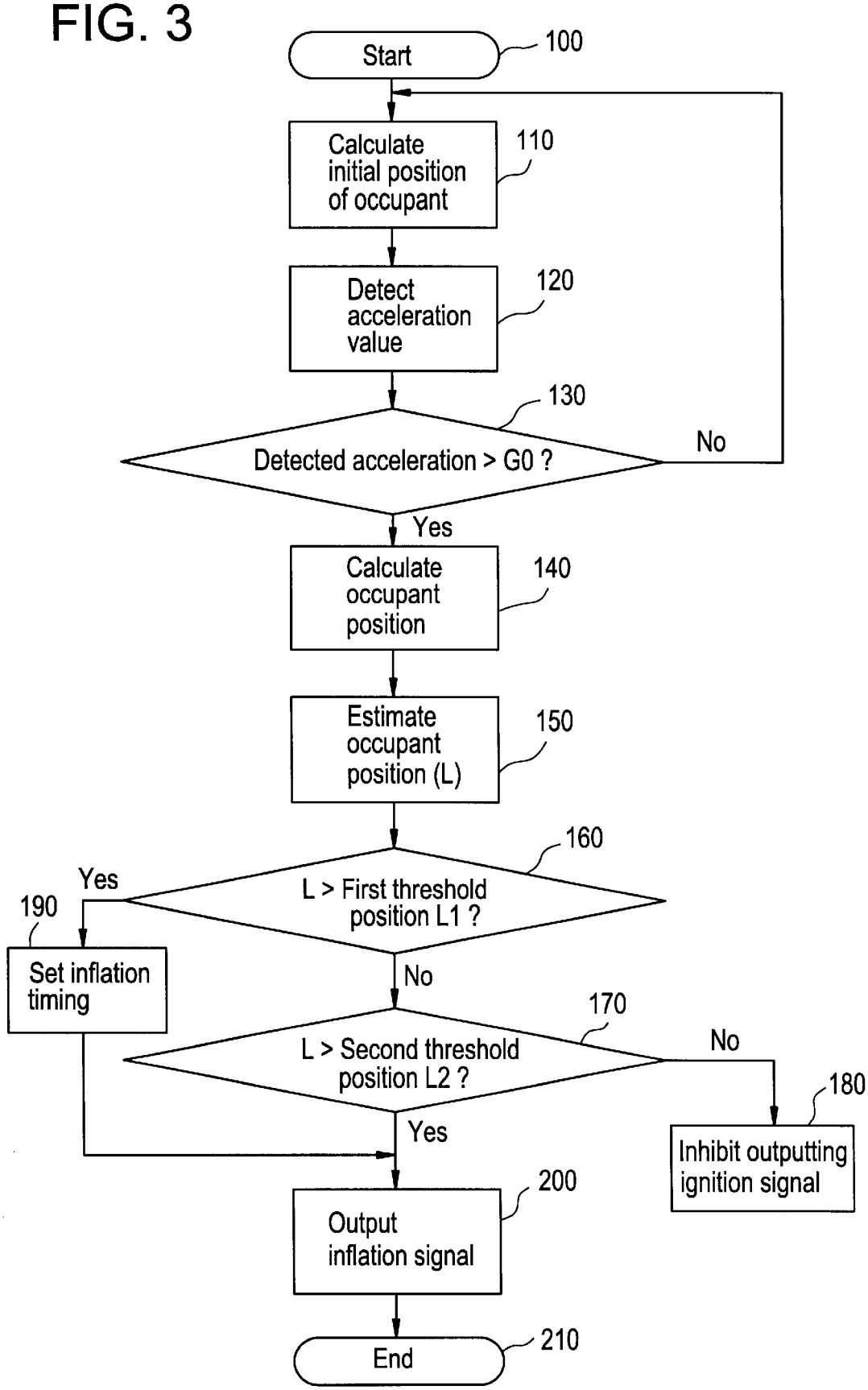
FIG. 3 is a flow chart for explaining the operation of the occupant protection apparatus shown in FIG. 1.

The operation of the occupant protection apparatus thus configured according to the embodiment will be explained with reference to a flow chart shown in FIG. 3.

When a power supply of a microcomputer is turned on which is formed by the collision determination circuit 11, second ignition control circuit 14, occupant position calculation circuit 18 and ignition timing determination circuit 19, the process proceeds to a step 110 for detecting the position of an occupant from a start step 100. In the step 110, the occupant position calculation circuit 18 determines whether or not the occupant is sitting on the passenger seat on the basis of the output signal from the infrared ray sensor 16 representing the presence or not-presence of the occupant. When it is determined that the occupant is sitting on the passenger seat, the occupant position calculation circuit 18 calculates newest data of the distance between the instrument panel and the head of the occupant sitting on the passenger seat and updates the data, that is, the previous data is replaced by the newest data. Then, the process proceeds to an acceleration value detecting step 120.

In the step 120, the collision determination circuit 11 detects the acceleration signal from the acceleration sensor 10 and determines whether the magnitude of the acceleration represented by the acceleration signal thus detected is larger than a reference value G0 or not in the next step 130.

Figure 4:
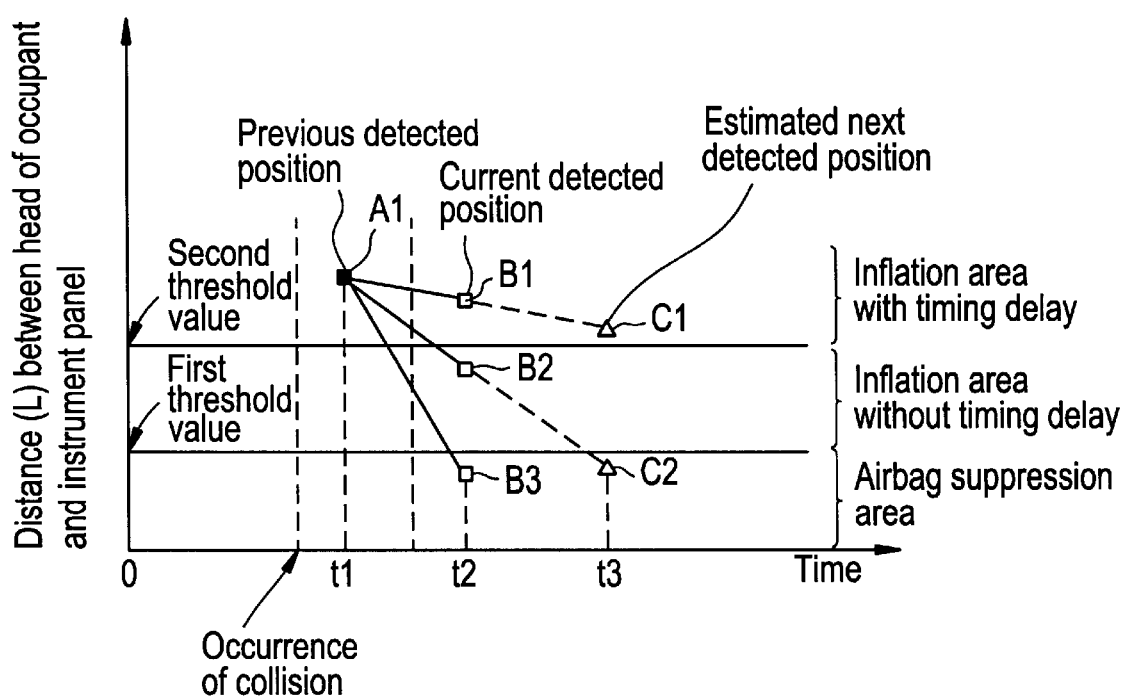
FIG. 4 is a diagram for explaining the estimation of the position of the head of an occupant in FIG. 3.

When it is determined in the step 130 that the magnitude of the acceleration represented by the acceleration signal thus detected is not lager than the reference value G0, it is determined that collision with such a magnitude necessary for protecting the occupant has not been occurred and then the process returns to the step 110. In contrast, when it is determined in the step 130 that the magnitude of the acceleration represented by the acceleration signal thus detected is larger than the reference value G0, it is determined that collision with such a magnitude necessary for protecting the occupant has been occurred and then the process proceeds to an occupant position calculation step 140. In the step 140, newest data of the distance between the instrument panel and the head of the occupant sitting on the passenger seat is calculated like the step 110 and then the process proceeds to an occupant position (L) estimation step 150. In the step 150, as shown in FIG. 4, the position of the head of the occupant (marks Δ shown in the figure) after a predetermined time period from now is estimated on the basis of the position of the head of the occupant ( mark ■ shown in the figure) calculated in the step 110 and the position of the head of the occupant (marks □ shown in the figure) calculated in the step 140. In FIG. 4, t1, t2 and t3 represent the position detection timings.

When it is determined in a step 160 that the estimated position L of the head of the occupant sitting on the passenger seat from the instrument panel after the predetermined time period which was estimated by the step 150 is not larger than the first threshold value (L1) and further when it is determined in a step 170 that the estimated position L after the predetermined time period is not larger than the second threshold value (L2), the process proceeds to a step 180. In this step 180, it is determined that, since the head of the occupant locates quite closely to the instrument panel, the occupant will take a punch and may fall into a dangerous state if the air bag is inflated in this state. Thus, the ignition timing determination circuit 19 is restrained from supplying to the second ignition control circuit 14 the ignition signal for driving and igniting the passenger seat side detonator 15 which inflates the passenger seat side air bag (alternately, only one of the detonators 15a and 15b may be ignited so as to weaken a punch force applied to the occupant).

When it is determined from the steps 160 and 170 that the estimated position L of the head of the occupant sitting on the passenger seat from the instrument panel is between the first threshold value (L1) and the second threshold value (L2), the process proceeds from the step 170 to a step 200. In this step 200, it is determined that the head of the occupant can not be protected by the air bag if the air bag is not inflated immediately. Thus, the ignition timing determination circuit 19 supplies to the second ignition control circuit 14 the signal for immediately inflating the passenger seat side air bag thereby to simultaneously drive and ignite the detonators 15a and 15b.

When it is determined in the step 160 that the estimated position L of the head of the occupant sitting on the passenger seat from the instrument panel is larger than the first threshold value (L1) and that the passenger seat is in a reclined state, it is determined to be dangerous if the air bag is inflated immediately because the head of the occupant can not reach the end portion of the air bag when the air bag is fully inflated but the head of the occupant reaches the end portion of the air bag after the air bag is fully inflated. Thus, in this case, the process proceeds to a step 190, whereat the process is stopped for the time period estimated in the step 150, that is, the time period (inflation timing period) required for the head of the occupant reaching the position between the first and second threshold values (between L1 and L2), and then the process proceeds to a step 200. In the step 200, the ignition timing determination circuit 19 supplies to the second ignition control circuit 14 the signal for immediately inflating the passenger seat side air bag thereby to simultaneously drive and ignite the detonators 15a and 15b. The distance of the head of the occupant may be obtained through the image processing in place of using the infrared sensor or the ultrasonic sensor. Further, in the aforesaid embodiment, although the explanation has been made that only one of the detonators 15a and 15b is ignited thereby to inflate the air bag in the inflation suppression area, the embodiment may be arranged in a manner that the other of the detonators 15a and 15b is ignited succeeding to the ignition of the one of the detonators 15a and 15b.

Figure 5:
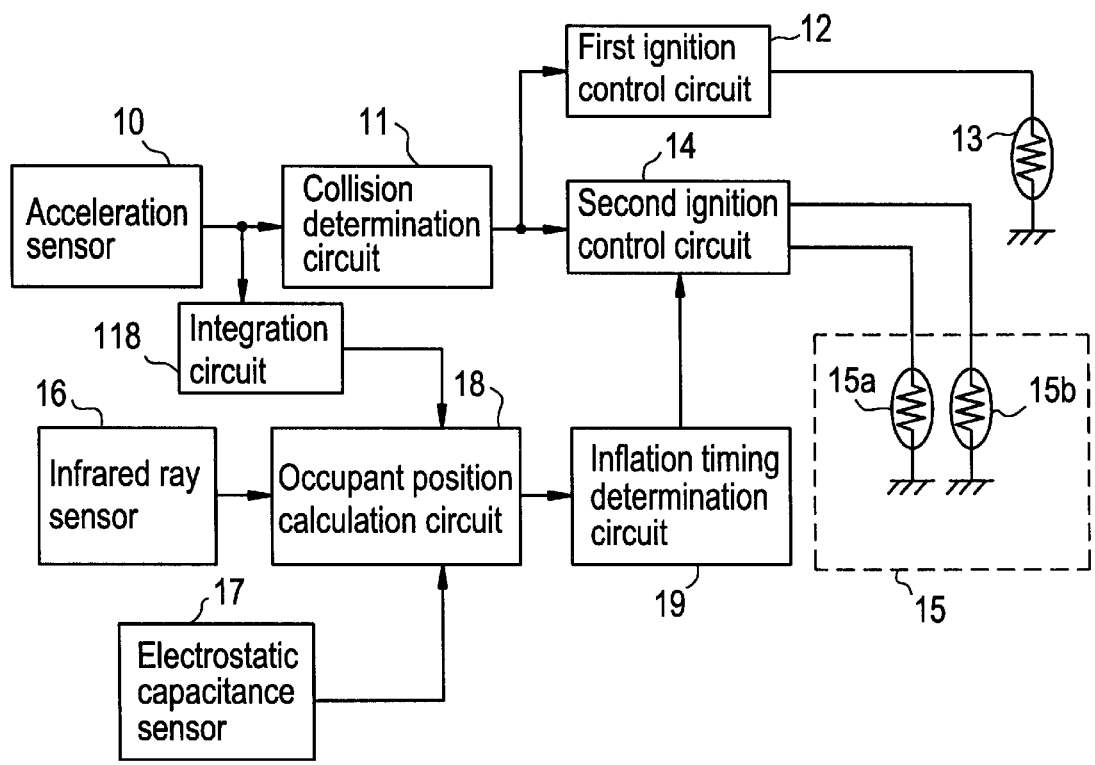
FIG. 5 is a block diagram of an occupant protection apparatus according to the second embodiment of the present invention.
Figure 6:
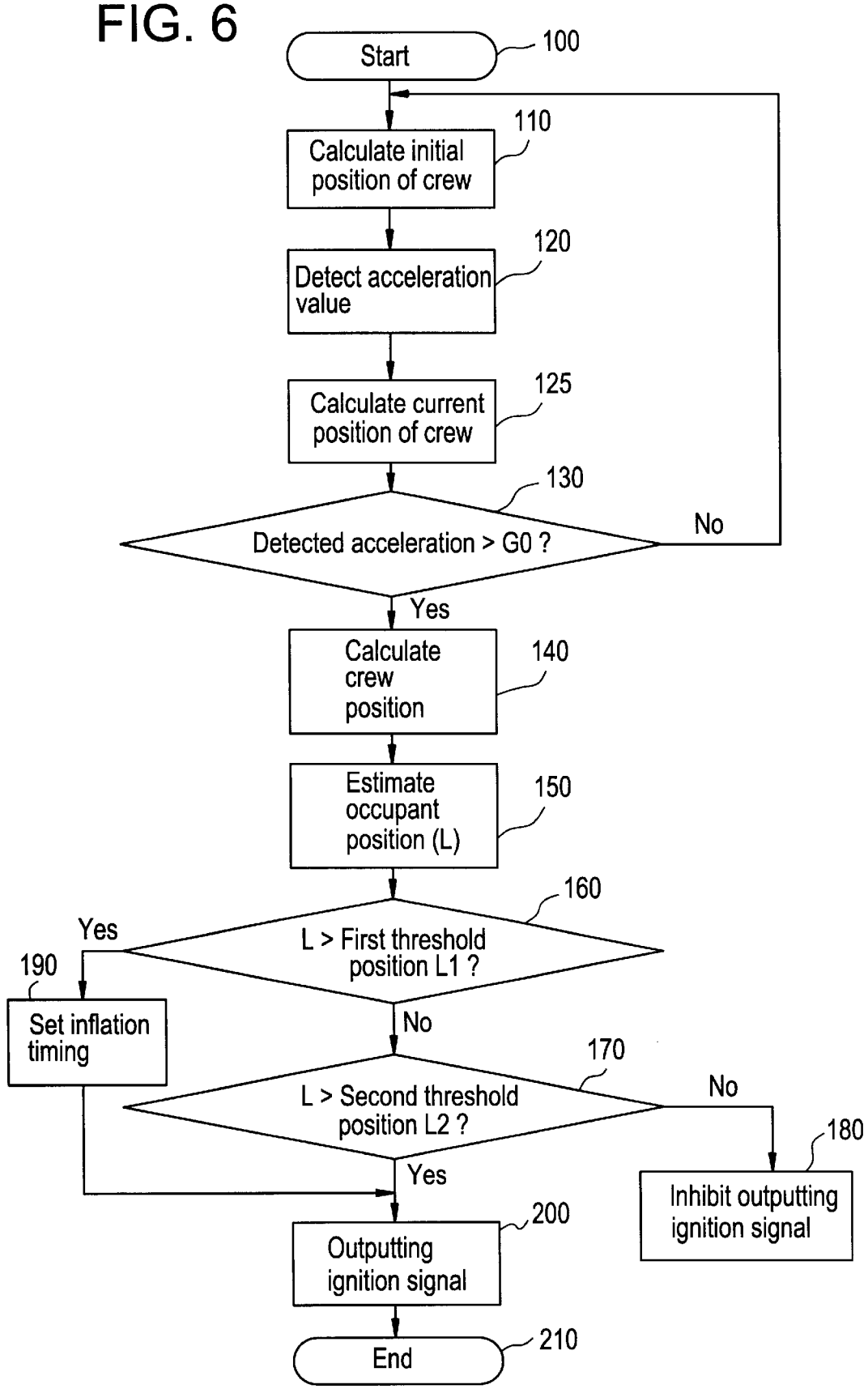
FIG. 6 is a flow chart for explaining the operation of the occupant protection apparatus shown in FIG. 5.

The occupant protection apparatus according to the second embodiment of the present invention will be explained with reference to FIGS. 5 and 6. In these figures, portions identical to those of FIGS. 1 and 3 are referred to by the common symbols, with explanation thereof being omitted. As shown in FIG. 5, an integration circuit 118 is further provided in this embodiment.

Figure 7:
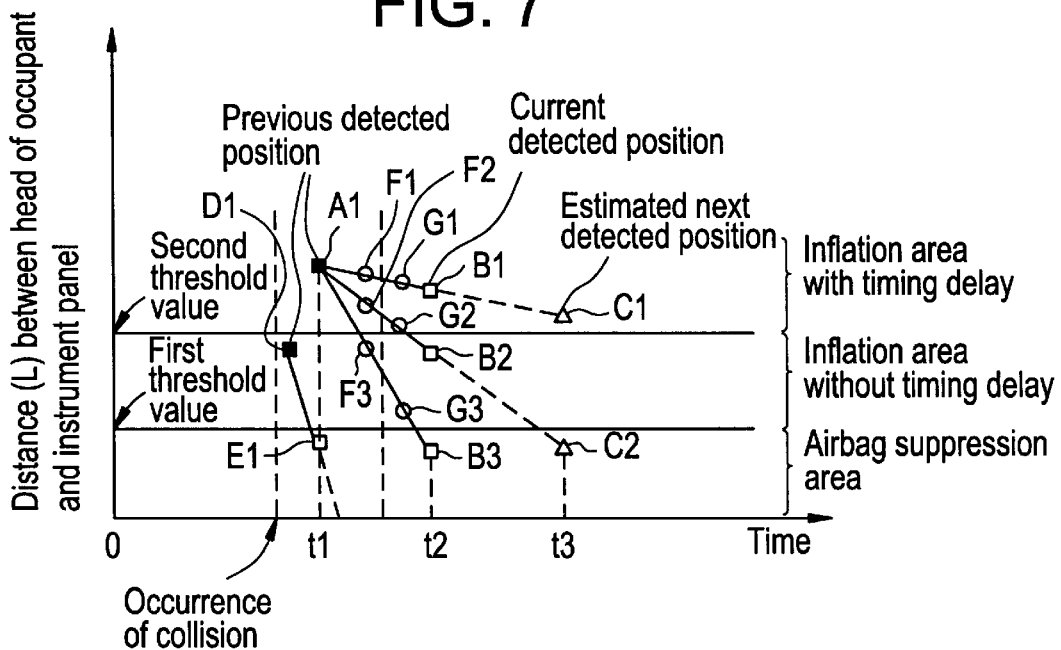
FIG. 7 is a diagram for explaining the estimation of the position of the head of an occupant in FIG. 6.
Figure 8:
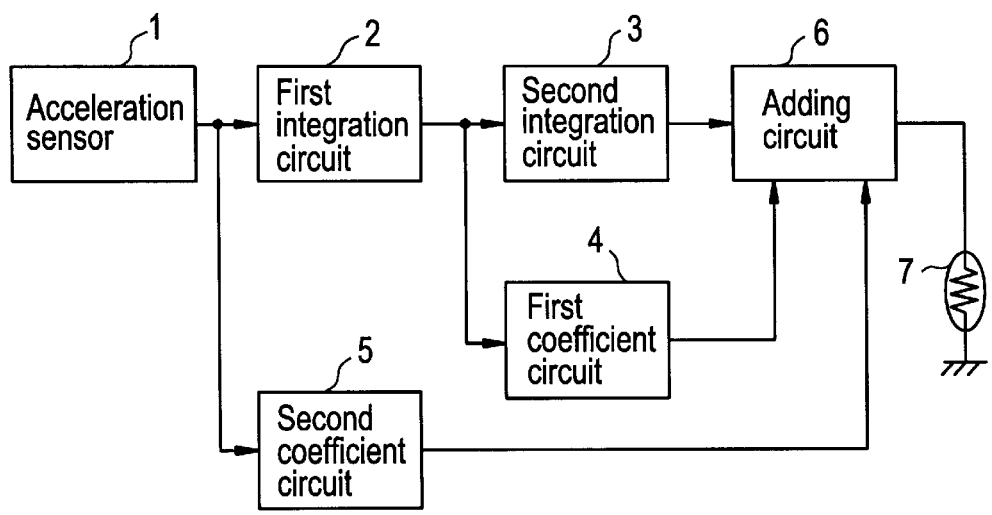
FIG. 8 is a block diagram of a conventional occupant protection apparatus.

The integration circuit 118 integrates twice the acceleration signal supplied from the acceleration sensor 10 to calculate an amount of deviation of the head of an occupant at the time where the acceleration is applied to the head of the occupant. The integration circuit 118 may be arranged by serially connecting two primary integration circuits. Alternately, an amount of the deviation may be estimated by using a circuit arranged to operate as shown in FIG. 7.

A reference numeral 18 depicts an occupant position calculation circuit which determines whether or not an occupant is sitting on the passenger seat on the basis of the output from the infrared ray sensor 16. The occupant position calculation circuit 18 further determines, on the basis of the detection signal from the electrostatic capacitance sensor 17, that the head of the occupant locates in the inflation suppression area (see FIG. 2) when the detected distance of the head from the instrument panel represents that the head of the occupant is positioned between 0 and the first threshold value (L1); that the head of the occupant locates in the inflation area without timing delay (see FIG. 2) when the detected distance represents that the head of the occupant is positioned between the first threshold value (L1) and the second threshold value (L2) (first threshold value (L1) <second threshold value (L2)); and that the head of the occupant locates in the inflation area with timing delay (see FIG. 2) when the detected distance represents that the head of the occupant is positioned away from the second threshold value (L2).

Every time the occupant position calculation circuit 18 receives a distance signal (the detection signal) from the electrostatic capacitance sensor 17, the occupant position calculation circuit 18 sets the detected distance represented by the distance signal as an initial value (initial position of the occupant) and subtracts the deviation amount supplied from the integration circuit 18 from the initial value to calculate the distance (current position of the occupant) of the head of the occupant from the instrument panel. Thus, the current position of the occupant can be calculated with a shorter period as compared with the case where the current position of the occupant is obtained by using only the output of the electrostatic capacitance sensor 17.

The operation of the occupant protection apparatus thus configured according to the embodiment will be explained with reference to a flow chart shown in FIG. 6.

In a step 120, the collision determination circuit 11 detects the acceleration signal from the acceleration sensor 10. Then, in a step 125, the integration circuit 18 integrates twice the acceleration signal to calculate an amount of the deviation of the head of the occupant, and the occupant position calculation circuit 18 subtracts the deviation amount from the actual measured value (the initial position of the head of the occupant) obtained in a step 110 to obtain the current position of the head of the occupant. Thereafter, the collision determination circuit 11 determines whether the magnitude of the acceleration represented by the acceleration signal thus detected in the step 130 is larger than the reference value G0 or not in the next step 130.

When it is determined in the step 130 that the magnitude of the acceleration represented by the acceleration signal thus detected is not lager than the reference value G0, it is determined that collision with such a magnitude necessary for protecting the occupant has not been occurred and then the process returns to the step 110. In this case, as to the calculation of the deviation amount in the step 125, if the detection period of the acceleration signal is sufficiently shorter than the position detection period of the electrostatic capacitance sensor 17, the process may return to the step 110 after repeating the steps 125 and 130 for several number of times.

In contrast, when it is determined in the step 130 that the magnitude of the acceleration represented by the acceleration signal thus detected is larger than the reference value G0, it is determined that collision with such a magnitude necessary for protecting the occupant has been occurred and then the process proceeds to an occupant position calculation step 140. In the step 140, newest data of the distance between the instrument panel and the head of the occupant sitting on the passenger seat is calculated like the step 110 or steps 125–130 and then the process proceeds to an occupant position (L) estimation step 150. In the step 150, as shown in FIG. 7, the positions of the head of the occupant after the predetermined time period from now is estimated on the basis of the position of the head of the occupant ( marks F1, F2 and F3 shown in the figure) calculated in the steps 120–125 and the positions of the head of the occupant (marks G1, G2 and G3 shown in the figure) calculated in the step 140. The processes succeeding to the step 160 are same as the first embodiment shown in FIG. 3.

Figure 2:
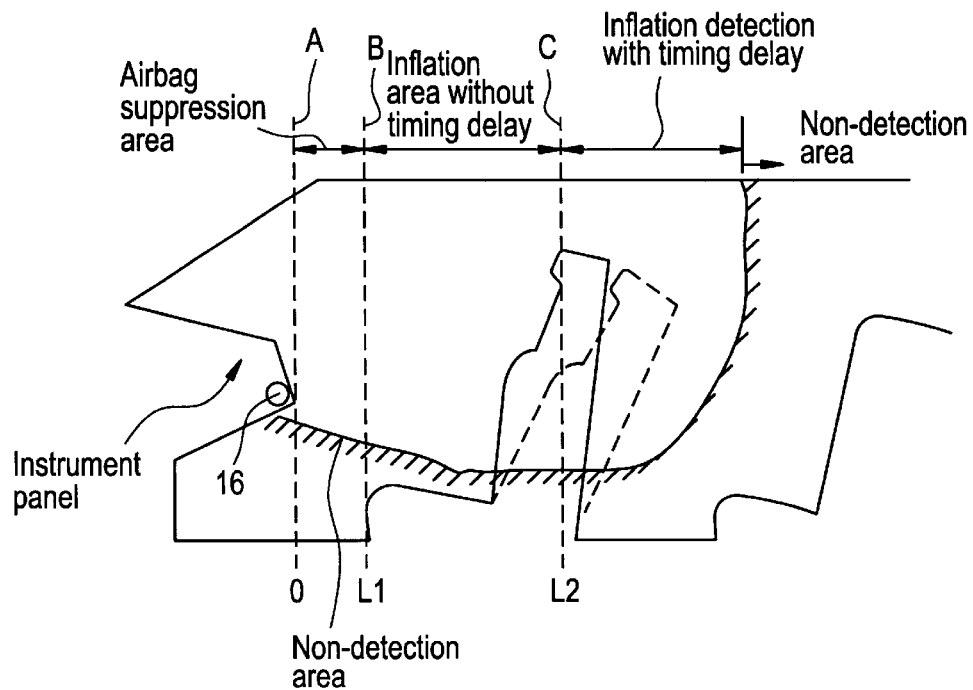
FIG. 2 is a diagram for explaining an inflation suppression area, an inflation area without timing delay and an inflation area with timing delay set by a timing control circuit (ignition timing determination circuit) used in FIG. 1.

In the aforesaid explanation, at the time of determining the boundaries of the inflation suppression area, the inflation area without timing delay and the inflation area with timing delay shown in FIG. 2, the first threshold value (L1) (shown by a dotted line B) is set at the position away by about 20 cm from the tip end portion (shown by a dotted line A) of the instrument panel, and the second threshold value (L2) (shown by a dotted line C) is set at the distance to the upper end portion of the seat in a not-reclined state (the state of the seat shown by a steady line in FIG., 2) from the tip end portion (shown by the dotted line A) of the instrument panel. In other words, when the occupant does not sit on the seat in a reclined state but sits on the seat in a normal state (not-reclined state), there is no inflation area with timing delay, and so the head of the occupant locates in the inflation suppression area or the inflation area without timing delay.

In contrast, when the occupant sits on the seat in the reclined state (the state of the seat shown by a dotted line in FIG., 2), the head of the occupant locates in the inflation area with timing delay.

The occupant position calculation circuit 18 determines (1) high-speed collision and (2) middle-speed collision on the basis of the degree of the inclination of a line coupling detected positions of the head. To be more concrete, if the degree of the inclination of the line is smaller than a predetermined degree, it is determined that the collision corresponding to the middle-speed collision has occurred, so that the passenger seat side detonator 15 is driven and ignited in accordance with the aforesaid manner (see the lines originated from the mark ▮ representing the collision shown in the upper side in FIG. 4).

In contrast, if the degree of the inclination of the line is not smaller than the predetermined degree and changes abruptly, it is determined without estimating the next detection position that the collision corresponding to the high-speed collision has occurred , thereby instructing the ignition timing determination circuit 19 to the instant inflation of the air bag. For example, each of lines A1–C1, A1–C2 and A1–B3 shown in FIG. 7 corresponds to the middle-speed collision, and a line D1–E1 corresponds to the high-speed collision.

As explained above, according to the first aspect of the present invention, since the threshold values to be compared with the distance between the head of the occupant and the instrument panel are set in correspondence to the inflation suppression area, the inflation area without timing delay and the inflation area with timing delay, respectively, the present invention is advantageous in that the air bag can be inflated effectively and so the protection efficiency for an occupant can be improved.

According to the second aspect of the present invention, since a plurality of detonators are provided for a single inflator, the present invention is advantageous in that it becomes possible to weaken the inflating power, to inhibit the inflation and to shift the inflating timing in the respective areas.

According to the third aspect of the present invention, since the threshold values set by the timing control circuit (ignition timing determination circuit) are set in a manner that the distance from the instrument panel is larger in the order of the threshold values defining the inflation suppression area, the inflation area without timing delay and the inflation area with timing delay , the present invention is advantageous in that the inflation operation of the air bag can be optimized.

According to the fourth aspect of the present invention, when it is determined by the timing control circuit (ignition timing determination circuit) that the distance of the head of the occupant from the instrument panel is in the inflation area with timing delay, the timing at which the head of the occupant reaches the inflation area without timing delay due to the collision is estimated, and so the detonator can be ignited so that the inflation of the air bag can be inflated at the estimated timing. Thus, the present invention is advantageous in that the air bag can be inflated at an optimum state even if the occupant sits on the seat in a reclined state.

According to the fifth aspect of the present invention, since the inflation force of the air bag can be weakened when the head of the occupant locates in the inflation suppression area, the present invention is advantageous in that a punch force applied to the occupant can be weakened.

Further, according to the sixth aspect of the present invention, the reference distance of the head of the occupant from the instrument panel is repeatedly obtained with a long period of time, and the reference distance is interpolated during the long period by using a deviation value (amount of deviation) which is obtained easily by integrating the acceleration signal twice. Thus, the present invention is advantageous in that the distance of the head of the occupant from the instrument panel can be obtained easily and continuously with high accuracy.

According to the seventh aspect of the present invention, the reference distance of the head of the occupant from the instrument panel is surely obtained repeatedly with a long period of time, and the reference distance is interpolated until the next reference distance is obtained by using a deviation value which is obtained by integrating the acceleration signal twice. Thus, the present invention is advantageous in that the distance of the head of the occupant from the instrument panel can be obtained easily and continuously with high accuracy, and the inflation timing of the air bag or the like can be set easily.

According to the eighth aspect of the present invention, the deviation value calculated by an integration means is subtracted from a distance measured by a first distance measuring means only when it is determined that the head of the occupant sitting on the seat locates in the inflation area with timing delay. Thus, the present invention is advantageous in that, when the head of the occupant locates in the inflation area with timing delay, the air bag can be inflated the moment where the head moves into the inflation area without timing delay.

According to the ninth aspect of the present invention, since the distance is calculated continuously, the present invention is advantageous in that the optimum inflation timing can be obtained.

What is claimed is:

1. An occupant protection apparatus, comprising:
   an acceleration sensor for detecting acceleration of a vehicle at a time of collision and outputting an acceleration signal representing a magnitude of the acceleration;
   an inflator having two detonators for driving a main body of said protection apparatus:
   a timing control circuit for measuring a distance between an instrument panel and a head of an occupant sitting on a seat slidable along a longitudinal direction of the vehicle and having a reclining function, the timing control circuit for calculating an estimated distance based on the distance measured and the acceleration, the timing control circuit for comparing the estimated distance with threshold values, the timing control circuit for controlling a timing for igniting the two detonators in accordance with a result of the comparison; and
   an ignition control circuit for igniting said detonators in accordance with the timing controlled when the acceleration signal is outputted from said acceleration sensor,
   wherein said timing control circuit sets the threshold values to be compared with the distance between the head of the occupant and the instrument panel in correspondence with an inflation suppression area, an inflation area without timing delay and an inflation area with timing delay, respectively;
   the ignition control circuit ignites one of the two detonators when the timing control circuit determines that the head of the occupant is in the inflation suppression area; and
   the ignition control circuit ignites both of the two detonators at the same time when the timing control circuit determines that the head of the occupant is in the inflation area without timing delay.

2. The occupant protection apparatus according to claim 1, wherein the threshold values set by said timing control circuit are set in accordance with the distance from said instrument panel in an order of the inflation suppression area, the inflation area without timing delay and the inflation area with timing delay.

3. The occupant protection apparatus according to claim 1, wherein, when said timing control circuit determines that the head of the occupant is located in the inflation area with timing delay, said timing control circuit estimates a timing at which the head of the occupant shifts to the inflation area without timing delay from the inflation area with timing delay, and said plurality of detonators are simultaneously ignited at the estimated timing.

4. The occupant protection apparatus according to claim 1, further comprising a sensor at the instrument panel, the sensor for measuring a distance between the instrument panel and the head of the occupant.

5. The occupant protection apparatus according to claim 1, wherein the two detonators inflate the airbag for protecting a passenger in a passenger's seat.

6. The occupant protection apparatus according to claim 5, further comprising a third detonator for inflating an airbag for protecting a driver in a driver's seat.

7. A distance measuring method, comprising the steps of:

measuring repeatedly with a first period of time a distance between the head of an occupant sitting on a seat and an instrument panel by using output signals of a plurality of sensors;

integrating twice with a second period of time shorter than said first period of time an acceleration signal representing a magnitude of acceleration of a vehicle from an acceleration sensor which is one of said plurality of sensors thereby to obtain an amount of deviation of a position of the head of the occupant; and subtracting the amount of the deviation obtained through the integration from the distance thus measured with the first period of time, thereby to estimate a distance between the head of the occupant sitting on the seat and the instrument panel.

8. An occupant protection apparatus, comprising:

a first distance measuring means for measuring repeatedly with a first period of time a distance between the head of an occupant sitting on a seat and an instrument panel by using output signals of a plurality of sensors;

an integration means for integrating with a second period of time shorter than said first period of time an acceleration signal representing a magnitude of acceleration of a vehicle from an acceleration sensor which is one of said plurality of sensors, thereby to obtain an amount of deviation of a position of the head of the occupant;

a second distance measuring means for subtracting the amount of deviation obtained by said integration means from the distance measured by said first distance measuring means, thereby to measure a distance between the head of the occupant sitting on the seat and the instrument panel; and a driving control means for allowing an ignition signal for igniting and driving a detonator to be outputted when the distance measured by said second distance measuring means exceeds a threshold value.

9. The occupant protection apparatus according to claim 8, wherein said threshold value includes a first threshold value which is set in a vicinity of the instrument panel and defines an inflation suppression area for restricting inflation of an air bag between the instrument panel and the occupant, and a second threshold value which is set so as to distinguish an inflation area without timing delay set at an outer side of the inflation suppression area from an inflation area with timing delay set at an outer side of the inflation area without timing delay; and wherein said driving control means subtracts the amount of the deviation calculated by said integration means from the distance measured by said first distance measuring means to obtain a distance between the head of the occupant sitting on the seat and the instrument panel only when it is determined that the head of the occupant sitting on the seat locates in the inflation area with timing delay.

10. The occupant protection apparatus according to claim 9, wherein said driving control means allows to supply an ignition signal for driving said detonator when it is determined that the distance between the head of the occupant and the instrument panel thus obtained is shifted into the inflation area without timing delay.

* * * * *